(12) United States Patent
Kujawa

(10) Patent No.: US 6,832,690 B2
(45) Date of Patent: Dec. 21, 2004

(54) GUIDING DEVICE FOR A FLOTATION MACHINE

(75) Inventor: Christian Kujawa, Highlands Ranch, CO (US)

(73) Assignee: Outokumpu Oyj, Espoo (FI)

( * ) Notice: Subject to any disclaimer, the term of this patent is extended or adjusted under 35 U.S.C. 154(b) by 0 days.

(21) Appl. No.: 10/293,413

(22) Filed: Jan. 2, 2003

(65) Prior Publication Data

US 2004/0129621 A1 Jul. 8, 2004

(51) Int. Cl.[7] .............................................. B03D 1/16
(52) U.S. Cl. ....................................................... 209/169
(58) Field of Search ................................ 209/169, 170; 261/87, 93

(56) References Cited

U.S. PATENT DOCUMENTS 1,268,630 A * 6/1918 Ruth
2,304,270 A * 12/1942 Mead et al. ................. 209/169
2,765,078 A * 10/1956 Kelsey
3,700,103 A * 10/1972 Giebel

FOREIGN PATENT DOCUMENTS

| CA | 732254 | * 4/1966 |
| RO | 105408 | * 12/1994 |
| SE | 42370 | * 12/1916 |
| SU | 297395 | * 7/1965 |

* cited by examiner

Primary Examiner—Thomas M. Lithgow
(74) Attorney, Agent, or Firm—Morgan&Finnegan, LLP

(57) ABSTRACT

The Invention relates to a flotation machine (1) which at least consists of a flotation cell (2) having a means for feeding slurry in the flotation cell, a gas dispersion mechanism (3) for feeding gas into the slurry and producing froth, a means for removing froth from the flotation cell and a means for removing tailings from the flotation cell, when there is arranged at least one guiding device (4) near the gas dispersion mechanism (3) in order to guide the dispersed gas (5) away from the gas dispersion mechanism (3).

7 Claims, 2 Drawing Sheets

GUIDING DEVICE FOR A FLOTATION MACHINE

Figure 1:
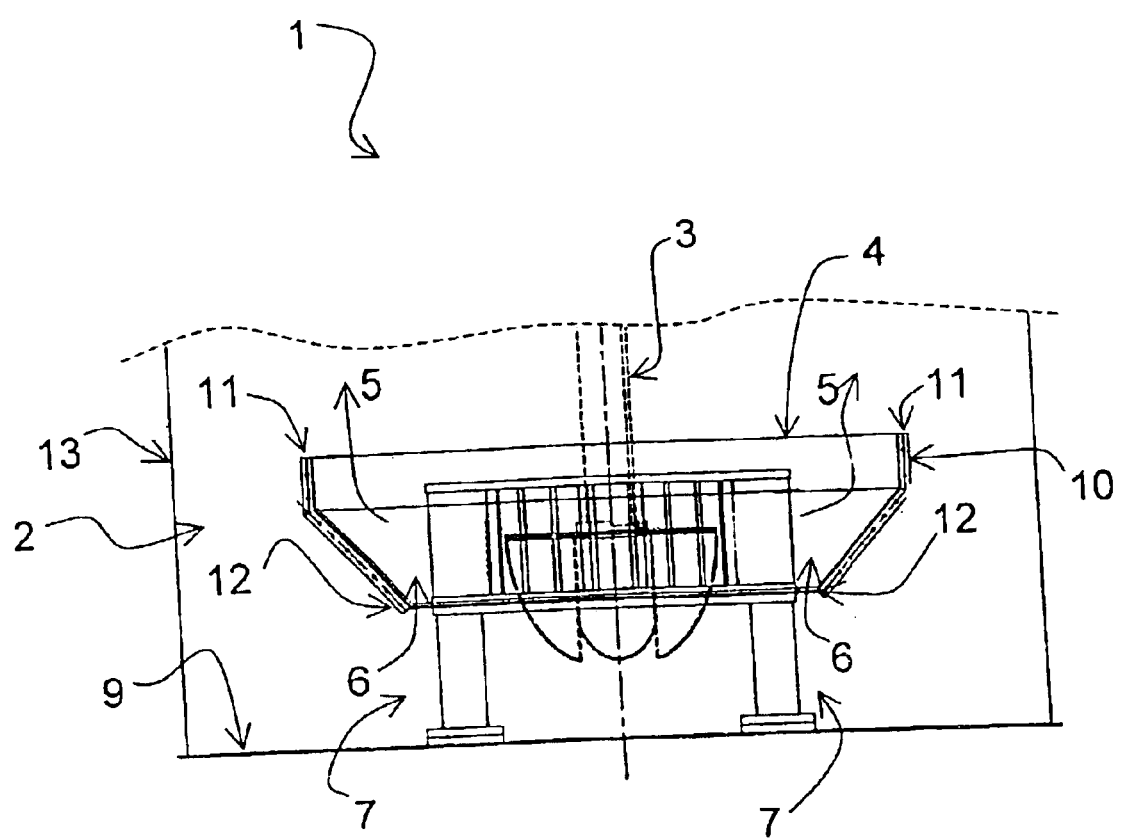

The invention relates to a flotation machine which consists of a flotation cell having a means for feeding slurry in the flotation cell, a gas dispersion mechanism for feeding gas into the slurry and producing froth, a means for removing froth from the flotation cell and a means for removing tailings from the flotation cell. According to the invention there is arranged at least one guiding device near the gas dispersion mechanism in order to guide the dispersed gas away from the gas dispersion mechanism.

A froth flotation machine for recovering valuable mineral material, normally with some hydrophobic surface, normally comprises a flotation cell in the form of a tank having an inlet in the cell wall for feeding slurry to be floated as well as an outlet for tailings in the lower part of the cell. Flotation cells may be single mixing vessels, in series or in parallel. They may be either rectangular or cylindrical in shape, in horizontal or upright position. Gas is supplied by some method to the gas dispersion mechanism, either through the hollow rotating shaft to the gas dispersion mechanism or by some independent supply line. The dispersion mechanism causes low pressure zones as well as high pressure zones as it rotates. In the gas dispersion mechanism the slurry in the flotation machine is mixed with the separately supplied gas, creating gas bubbles, which are discharged and dispersed into the whole space of the flotation cell. Often stationary baffles are installed around the gas dispersion mechanism to promote gas dispersion and attenuate the rotation of the slurry in the flotation cell. The valuable hydrophobic material in the cell attaches preferentially to the gas bubbles and rise to the surface of the cell, forming a froth layer and overflowing out of the cell into the froth launders.

Nowadays it is becoming increasingly common to use upright cells, which are also cylindrical and normally flat-bottomed. One problem with flotation cells is sanding, i.e. solid matter builds up on the bottom of the cell in an immovable layer. This is usually due to a too small or ineffective mixing and gas dispersion mechanism, as in such a case the mixing zone of the mechanism does not extend far enough. Another common difficulty is that the mineral particles already attached to the gas bubbles cannot be removed from the flotation cell, because the flows forming in the cell and particularly at its surface and upper section are wrongly oriented or too weak i.e. preventing loaded gas bubbles from entering the froth zone or froth exiting the cell.

It is also known before a flotation machine, a rotor of which has a plurality of vertical oriented plates, which form the pumping chambers. Air is pumped to each chamber via a vertical downcomer, which also incorporates and supports a horizontal shroud directly above the rotor. This shroud also supports the vertical stator blades. While the slurry flow entering the rotor is initially deflected upwards as it exits the rotor pumping slots it is deflected horizontally by the overhung shroud and is pumped radially outwards through the stator blades.

A significant zone of turbulence is created by the high velocity flows exiting the gas dispersion mechanism. This is the most important region within the flotation device for it is in this region that particle suspension, gas dispersion and gas bubble and particle contact takes place. If the flotation mechanism fails to properly disperse the gas into fine bubbles or contacts the gas bubbles with particles throughout the cell or if the solids suspension is inadequate then the flotation process suffers and the overall recovery of the desired material will be less. During the dispersion of gas by mechanical agitation, which creates negative pressure zone at the intake and positive pressure zone at the discharge, it is possible that gas, which has been supplied by some means to the gas dispersion mechanism short-circuits from the positive pressure zone back to the negative pressure zone occurs. This phenomenon is at times desirable during normal flotation practice but it can become excessive and counter productive as in the case of high viscosity or high density pulps. The re-circulation effect of gas into the lower pressure zone in the cell could be a problem with liquids either of high viscosity or heavy particle concentrations. This unnecessary circulation of dispersed gas within the gas dispersion mechanism reduces the overall efficiency and output of the gas dispersion mechanism.

According to a Finnish patent application 20001699 it is known a rotor used in the flotation mechanism in the concentration of ores. This type of rotor is developed especially for a material, which is coarse and has a high specific gravity. According to the invention of the application, upper part of the rotor chambers under the rotor cover are formed to be downward inclined from the outer edge of the chambers into the core so that they form an angle between 5 to 70 degrees with the horizontal plane. It has been proved that a vertical section downward tapered rotor which is equipped with means to direct the slurry flow upwards instead of horizontal direction allows the rotor to vary the mixing flow patterns within the machine and without interfering with the upper enrichment and froth zones within the cell. The invention relates also to a method to incline slurry flow essentially at the same angle as that of the means itself.

The object of the present invention is to eliminate the internal gas re-circulation existing, eliminate the drawbacks of the prior art, and to enhance the operation of flotation machine by preventing the gas dispersed by gas dispersion mechanism to flow back into the suction zone of the gas dispersion mechanism.

The essential features of the invention are enlisted in the appended claims.

According to the invention there is arranged at least one guiding device near the gas dispersion mechanism in order to guide the dispersed gas away from the gas dispersion mechanism. The device of the invention advantageously separates the input and output pressure zones of the gas dispersion mechanism and thus prevents gas re-circulation within the gas dispersion mechanism. By placing the guiding device between the pressure zone and suction zone of the gas dispersion mechanism, it guides the gas away and because of the natural buoyancy of the gas also upwards in the flotation machine, out of the reach of the rotor suction zone. The guiding device is placed advantageously so, that the return flow of the pulp is not disturbed. The size of the guiding device can be advantageously dimensioned so, that it matches with the flotation cell size, rotor size, gas dispersion mechanism design, different pulp viscosities and densities and other flotation parameters. According to one application of the invention the guiding device is arranged to extend essentially symmetrically around at least part of the gas dispersion mechanism. According to one application of the invention the guiding device is arranged to extend essentially symmetrically around the whole gas dispersion mechanism. Then it guides all of the gas dispersed around the gas dispersion mechanism upwards in the cell.

According to the invention the guiding device comprises of at least one wall element. According to one application of the invention at least part of the wall element is directed essentially vertically in the cell. According to one application of invention at least part of the wall element is directed essentially horisontally in the cell. According to one application of invention at least part of the wall element is placed so, that it forms an angle of 0-90 degrees with the horizontal plane. According to one application of invention at least part of the wall element is essentially straight. According to another application of invention the wall element is essentially curved. According to other application of invention the guiding device is essentially cone-shaped, opening upwards in the cell. Then the gas flow goes directly upwards in the cell. According to other application of invention the guiding device is made of light and wear resistant material. Advantageously the upper edge of the guiding device is located more near to the cell wall than the lower edge, which promotes the gas flow into right direction and leaves more space in the lower part of the cell. By preventing the re-circulation of flotation gas, also more flotation gas can be fed into the cell, which improves the overall performance of the flotation machine. The upward pulp flow in the flotation machine aids the upward gas flow and therefore further improves the operation of flotation process. The guiding device is easy to install and for example could be attached to the flotation machine by at least one fastening element like bolt.

The invention is described further by means of the attached drawings.

FIG. 1 Guiding device in the flotation cell

Figure 2:
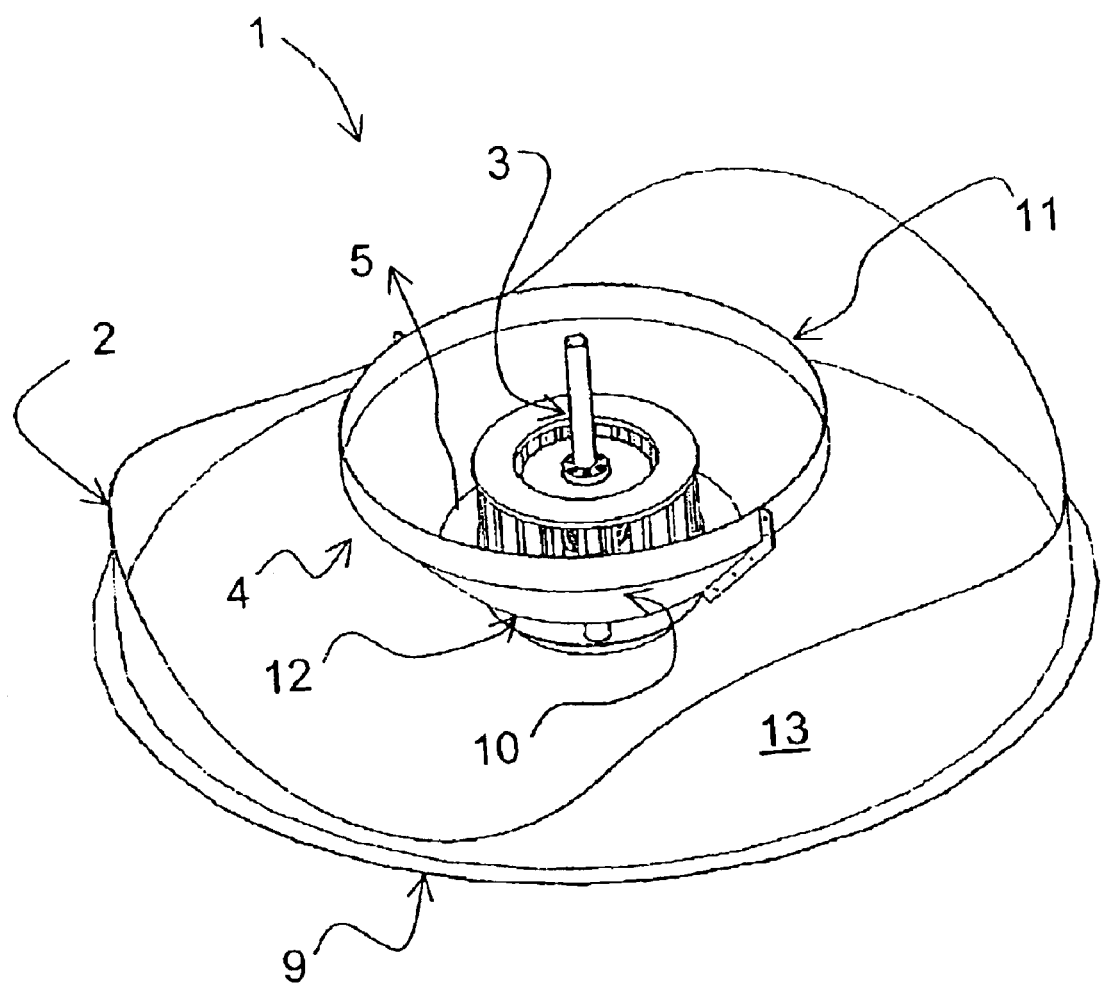

FIG. 2 Three-dimensional view of the guiding device

As illustrated in FIG. 1, a flotation machine 1 includes at least a flotation cell 2 having a means for feeding slurry in the flotation cell, a gas dispersion mechanism 3 for feeding gas 5 into the slurry and producing froth, a means for removing froth from the flotation cell and a means for removing tailings from the flotation cell. Also according to the invention there is arranged at least one guiding device 4 near the gas dispersion mechanism 3 in order to guide the dispersed gas away from the gas dispersion mechanism to prevent the recirculation of the flotation gas into the suction zone 7 of the gas dispersion mechanism 3. The guiding device 4 is arranged near the gas dispersion mechanism so that it guides the gas 5 away from the mechanism. The guiding device according to this example is cone-shaped, consisting of one wall element 10, which is directed upwards in the cell extending essentially symmetrically around the whole gas dispersion mechanism 3. The guiding device according to this example is made of light and wear resistant material. The guiding device 4 is arranged at the place between the pressure zone 6 and suction zone 7, like at neutral pressure zone between the inlet and outlet of the gas dispersion mechanism 3 in order to guide the immersed gas away from the suction zone 7. According to this example of the invention the upper edge 11 of the guiding device 4 is located more near to the cell wall 13 than the lower edge 12.

The guiding device is attached to flotation machine 1 by at least one fastening element like bolt.

In FIG. 2 there is presented a three dimensional view of the guiding device 4 of the one application of the invention. According to this example the guiding device 4 of flotation machine 1 is attached into the gas dispersion mechanism 3 near the cell bottom 9. The guiding device according to this example is cone-shaped, consisting of one wall element 10, which is directed upwards in the cell extending essentially symmetrically around the whole gas dispersion mechanism 3, thus guiding the gas 5 upwards in the cell 2. The upper edge 11 of the guiding device 4 is located more near to the cell wall 13 than the lower edge 12.

What is claimed is:

1. A flotation machine consisting essentially of:
   a flotation cell having a means for feeding slurry into the flotation cell;
   a gas dispersion mechanism for feeding gas into and dispersing gas within the slurry, producing a froth, the gas dispersion mechanism having a suction zone and a pressure zone;
   a means for removing the froth from the flotation cell;
   a means for removing tailings from the flotation cell; and
   a single stationary guiding device separating the pressure and suction zones of the gas dispersion mechanism, the guiding device comprising a substantially horizontal lower edge and a wall attached to the lower edge, a lower portion of the wall having an upwards opening conical shape and an upper portion of the wall having a cylindrical shape that extends vertically upward in a direction perpendicular to the lower edge, the guiding device guiding dispersed gas away from the pressure zone of the gas dispersion mechanism and preventing the dispersed gas from entering the suction zone of the gas dispersion mechanism.

2. A flotation machine according to claim 1, wherein the guiding device is attached between the pressure zone and the suction zone of the gas dispersion mechanism.

3. A flotation machine according to claim 1, wherein at least part of the wall is arranged so that it forms an angle of 0–90 degrees with the horizontal plane.

4. A flotation machine according to claim 1, wherein at least part of the wall is essentially straight.

5. A flotation machine according to claim 1, wherein the guiding device is made of a light and wear resistant material.

6. A flotation machine according to claim 1, wherein an upper edge of the guiding device is located more near to the cell wall than a lower edge of the guiding device.

7. A flotation machine according to claim 1, wherein the guiding device is attached to the flotation machine by at least one fastening element.

* * * * *